Patented May 27, 1952

2,598,587

UNITED STATES PATENT OFFICE 2,598,587

DI(1,4 DIAMINO-2-ARYL KETONE ANTHRAQUINONE)AMIDES OF AROMATIC DICARBOXYLIC ACIDS

Eduard Moergeli, Neuewelt, near Basel, Switzerland, assignor to Ciba Limited, Basel, Switzerland, a Swiss firm No Drawing. Application July 17, 1950, Serial No. 174,362. In Switzerland July 22, 1949

11 Claims. (Cl. 260—207.1)

According to this invention valuable vat dyestuffs of the anthraquinone series are made by reacting two molecular proportions of a 1:4-diaminoanthraquinonyl-2-aryl ketone, of which the aryl radical may contain substituents, with one molecular proportion of a reactive derivative of an aromatic dicarboxylic acid.

The 1:4-diaminoanthraquinonyl-2-aryl ketones used as starting materials may be prepared by the process of application Serial No. 74,265, filed February 2, 1949, for example, by condensing 1:4-dichloroanthraquinone-2-carboxylic acid chloride by the method of Friedel-Crafts with an unsubstituted or advantageously halogen substituted aromatic hydrocarbon, for example containing 6–12 carbon atoms. Such aromatic hydrocarbons are, for example, benzene, naphthalene, diphenyl, pyrene and especially halogen substitution products thereof, such as monochlorobenzene, o-dichlorobenzene, 4-chloro-1:1-diphenyl and also chlorinated naphthalenes, and furthermore other substitution products of benzene and higher aromatic hydrocarbons which are suitable for Friedel-Crafts reaction, for example, alkyl benzenes such as toluene, or alkoxy benzenes such as anisole.

Among the aromatic dicarboxylic acids, of which reactive derivatives, especially the acid chlorides, are reacted with the aforesaid starting materials in the present process there are to be understood only those of which the carboxyl groups are bound to aromatic nuclei (6-membered carbon rings). The two carboxyl groups may be bound to the same benzene ring. As examples of such mononuclear aromatic dicarboxylic acids there may be mentioned terephthalic acid and isophthalic acid.

It is of special advantage in some cases to use dicarboxylic acids which contain at least two aromatic 6-membered rings of which each carries a carboxyl group. These two rings may be bound together by a simple bond or by a bridge member. As examples of such dicarboxylic acids containing two benzene nuclei bound together there may be mentioned diphenyl-4:4'-dicarboxylic acids such as 3:3'- or 4:4'-azobenzene dicarboxylic acid. It may also be of advantage to use dicarboxylic acids which contain two or more, for example, up to 5, or preferably 3 or 4, rings condensed with one another. As examples of such dicarboxylic acids there may be mentioned naphthalene dicarboxylic acids, especially naphthalene-2:6-dicarboxylic acid and especially dicarboxylic acids containing more highly condensed ring systems such as anthraquinone-2:6- or -2:7-dicarboxylic acid, thianthrene dicarboxylic acids, benzanthrone dicarboxylic acids such as benzanthrone-Bz-1:6- or -2:6-dicarboxylic acid, or pyrene, chrysene or perylene dicarboxylic acids, and especially fluoranthene dicarboxylic acids.

The reaction of the reactive derivatives of such carboxylic acids with the above mentioned 1:4-diaminoanthraquinonyl-2-aryl ketones may advantageously be conducted at a raised temperature in an inert high boiling solvent such as mono-, di- or tri-chlorobenzene, nitrobenzene or naphthalene, and a catalytically active agent such as a tertiary amine, for example, pyridine or quinoline, may be used in known manner in small quantities or quantities sufficient for binding acid, if desired in combination with other acid-binding agents.

The products so obtained are valuable vat dyestuffs of the general formula

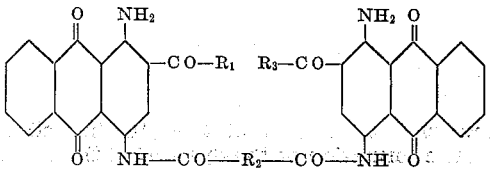

wherein $R_1$ and $R_3$ stand for an aryl radical each and wherein —CO—$R_2$—CO— stands for the radical of an aromatic dicarboxylic acid of the formula HOOC—$R_2$—COOH. They are suitable for dyeing or printing a very wide variety of fibers, especially cellulose fibers such as cotton, linen, and artificial silk of staple fibers of regenerated cellulose. In this manner there are obtained valuable tints which are deep and in part covered, and have good uniformity, tinctorial strength, and fastness to light and bucking.

The following examples illustrate the invention, the parts and percentages being by weight unless otherwise stated and the relationship of parts by weight to parts by volume being the same as that of the kilogram to the liter:

EXAMPLE 1

A mixture of 3.2 parts of fluoranthene dicarboxylic acid dichloride of the same composition as is used in British Patent No. 533,963, 8 parts of 1:4-diamino-2-(para-chlorobenzoyl)-anthraquinone, 5 parts each of quinoline and pyridine and 225 parts by volume of trichlorobenzene are heated, while stirring, up to 160° C. continuously in the course of 3 hours. The whole is then stirred for a further ½ hour, and the dyestuff of the formula

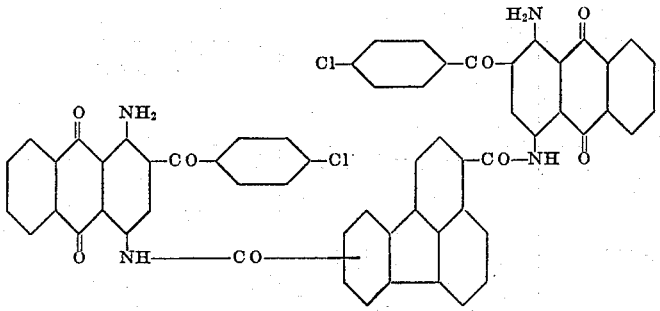

which separates in the form of grey needles, is filtered. It dissolves in concentrated sulfuric acid with a yellowish olive coloration, dyes cotton from an olive-green vat bluish grey tints which are fast to chlorine, boiling and light, and has a very high tinctorial strength in printing.

EXAMPLE 2

A mixture of 3.2 parts of fluoranthene dicarboxylic acid dichloride (see British Patent No. 533,963), 8.7 parts of 1:4-diamino-2-(meta-paradichlorobenzoyl)-anthraquinone, 10 parts of quinoline and 225 parts of trichlorobenzene is slowly heated up to 160° C. in the course of 3 hours while stirring, and then further stirred until the formation of the dyestuff of the following constitution

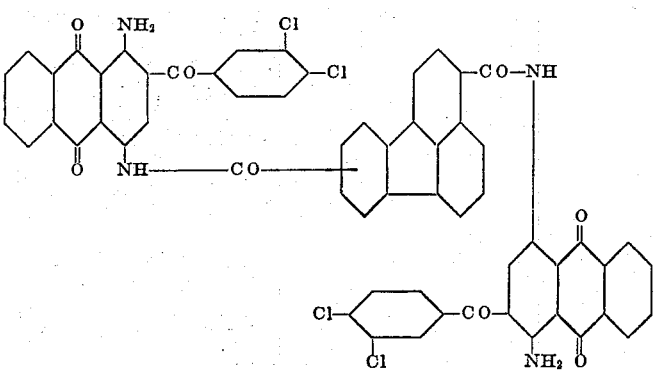

is complete. The dyestuff is separated by filtering while hot, washed in turn with trichlorobenzene, alcohol, dilute hydrochloric acid and water, and dried. It dyes vegetable fibers from a green vat somewhat more bluish grey tints than the dyestuff of Example 1 and likewise yields very powerful prints.

EXAMPLE 3

A mixture of 3.2 parts of 6-Bz-1-benzanthrone dicarboxylic acid, 250 parts by volume of trichlorobenzene, 15 parts by volume of thionyl chloride and 0.03 part of quinoline is stirred in a reflux apparatus first for ½ hour at 80° C. and then for a further ½ hour at 120° C. The temperature is further raised slowly, the remaining 25 parts by volume of solvent are distilled, and the whole is allowed to cool to 60° C. To the mixture, which now contains 6-Bz-1-benzanthrone dicarboxylic acid dichloride, 5 parts of pyridine, 5 parts of quinoline and 8 parts of 1:4-diamino - 2 - (para-chlorobenzoyl) - anthra - quinone are added, and the temperature is raised in stages to 160° C. in the course of 3 hours. The whole is stirred for a further 1½ hours at that temperature, and then the dyestuff of the formula

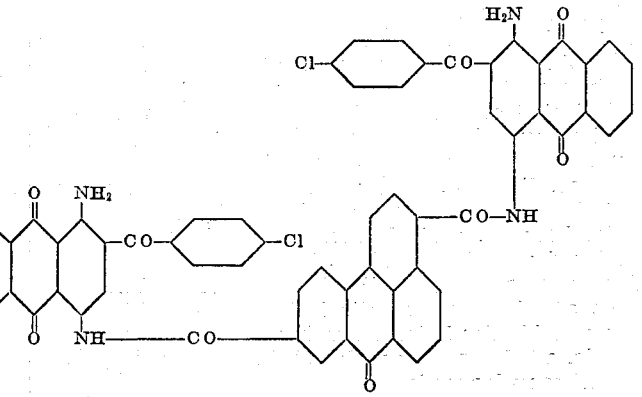

is separated by filtration at about 100° C. It dyes cotton from an olive-green vat very fast grey tints.

EXAMPLE 4

A mixture of 2.7 parts of 4:4'-diphenyldicarboxylic acid dichloride, 8 parts of 1:4-diamino-2-(para - chlorobenzoyl)-anthranquinone, 5 parts of pyridine and 225 parts of trichlorobenzene is treated in the same way as the mixture described in Example 1. There is obtained the dyestuff of the formula

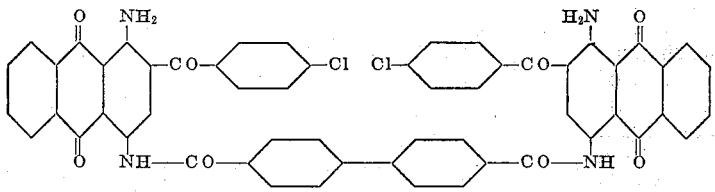

which dyes cotton from the vat very fast reddish blue tints.

A blue dyestuff is also obtained by using, instead of the diphenyldicarboxylic acid dichloride, an equivalent quantity of terephthalic acid dichloride.

In an analogous manner to that described in the foregoing examples two molecular proportions of the anthraquinone components mentioned in the following table and one molecular proportion of the acid components given therein can be reacted to produce further dyestuffs having the indicated properties. The acid components are used in the form of their acid chlorides.

toluene sulfonamide, 22 parts of sodium acetate, and 0.5 part each of copper acetate and cuprous chloride is heated while stirring for one hour at 170–175° C. The reaction product is poured into water and the water-soluble constituents are removed by boiling with water. For the purpose of further purification the product may be recrystallized from aqueous pyridine, whereby 1:4-di-(para - toluene - sulfonamido)-2-(3'-pyrenoyl)-anthraquinone is obtained in the form of a brown crystalline powder.

(c) 17 parts of 1:4 - di - (para-toluene sulfonamido) - 2-(3'-pyrenoyl)-anthraquinone are hydrolyzed in 150 parts of hydrofluoric acid (99 per cent. strength) by stirring for 10 hours at 0–5° C. The 1:4-diamino-2-(3'-pyrenoyl)-anthraquinone is precipitated by the addition of ice and water,

Table

| No. | Anthraquinone component 2 Mols | Acid component 1 Mol | Dyeing on cotton | Vat |
|---|---|---|---|---|
| 1 | 1:4-diamino-2-(parachlorobenzoyl)-anthraquinone. | 4:4'-azobenzene dicarboxylic acid. | grey | green. |
| 2 | do | 3:3'-azobenzene dicarboxylic acid. | reddish blue | olive-green. |
| 3 | do | 2:6-naphthalene dicarboxylic acid. | do | grey-blue. |
| 4 | do | thianthrene dicarboxylic acid of the composition used in U. S. Patent No. 2,338,516. | do | grey. |
| 5 | do | 2:6-benzanthrone dicarboxylic acid. | reddish blue-grey. | olive-green. |
| 6 | do | 2:8-chrysene dicarboxylic acid. | violet grey | Do. |
| 7 | 1:4-diamino-2-benzoylanthraquinone. | fluoranthene-dicarboxylic acid (see Example 1). | bluish grey | green. |
| 8 | 1:4-diamino-2-paratoluyl-anthraquinone. | do | grey | blue-green. |
| 9 | 1:4-diamino-2-anisoyl-anthraquinone. | do | do | green. |
| 10 | 1:4-diamino-2-naphthoylanthraquinone. | do | blue-grey | dull green. |
| 11 | do | 3:3'-azobenzene dicarboxylic acid. | blue | green-olive. |
| 12 | 1:4-diamino-2-(3'-pyrenoyl)-anthraquinone. | 4:4'-azobenzene dicarboxylic acid. | grey | olive-green. |

1:4 - diamino - 2-(3'-pyrenoyl)-anthraquinone may be prepared as follows:

(a) 55 parts of aluminum chloride are slowly introduced at 40–50° C., while stirring, into a mixture of 34 parts of 1:4-dichloranthraquinone-2-carboxylic acid chloride, 20 parts of pyrene and 250 parts of ortho-dichlorobenzene. The whole is stirred for 2 hours at 40–50° C., and then for a further hour at 60–65° C. The reaction product is then decomposed with ice and hydrochloric acid, and the solvent is removed by steam distillation. The radical is separated by filtration, and unreacted 1:4-dichloranthraquinone-2-carboxylic acid is extracted therefrom by means of a dilute solution of sodium carbonate. There are obtained 47 parts of 1:4-dichloro-2-(3'-pyrenoyl)-anthraquinone in the form of a brown powder which melts at 249° C. (uncorrected) after recrystallisation from ortho-dichlorobenzene.

(b) A mixture of 15 parts of 1:4-dichloro-2-(3'-pyrenoyl)-anthraquinone, 140 parts of paraand by-products are removed therefrom by first extracting at the boil with aqueous ammonia solution and then recrystallization from chlorobenzene.

The product is a green-blue crystalline powder, which is soluble in acetone to give a blue coloration and corresponds to the formula

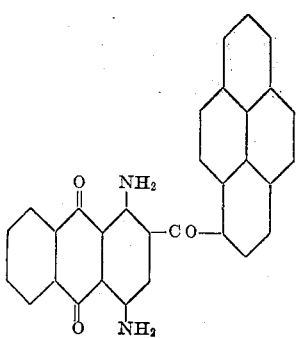

1:4-diamino-2-naphthoyl-anthraquinone may be prepared as follows:

81 parts of aluminum chloride are introduced, while stirring, into a solution at 40–45° C. of 69 parts of 1:4-dichloranthraquinone-2-carboxylic acid chloride in a mixture of 150 parts each of ortho-dichlorobenzene and naphthalene. The whole is stirred for 1 hour at 40–45° C. and for a further hour at 60–70° C., and the product is then worked up as described under (a) above. 1:4-dichloro-2-naphthoyl-anthraquinone melts at 214° C. (uncorrected) after repeated recrystallization from ortho-dichlorobenzene and toluene. The 1:4-dichloro-2-naphthoyl-anthraquinone is further reacted as described under (b) and (c) above, and 1:4-diamino-2-naphthoyl-anthraquinone is obtained. It crystallizes from ortho-dichlorobenzene in the form of blue crystals.

EXAMPLE 5

1.5 parts of the vat dyestuff obtained as described in Example 1 are vatted with 6 parts by volume of caustic soda solution of 36° Bé. and 3 parts of sodium hydrosulfite at about 50° C. in 300 parts of water. The stock vat so prepared is added to a dyebath containing in 1700 parts of water 4 parts by volume of caustic soda solution of 36° Bé. and 2 parts of sodium hydrosulfite, and then 100 parts of cotton are entered at 40° C. After 15 minutes 20 parts of sodium chloride are added and dyeing is continued for 1 hour and 40–50° C. The cotton is then squeezed, oxidized in the air, rinsed, acidified and again rinsed and, if desired, soaped at the boil. The cotton is dyed a fast grey tint.

What I claim is:
1. A vat dyestuff of the general formula

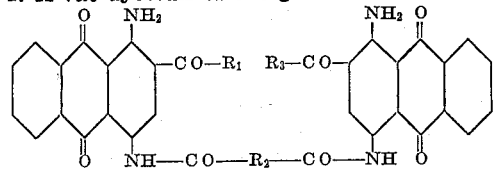

wherein $R_1$ and $R_3$ stand for an aryl radical each end wherein —CO—$R_2$—CO— stands for the radical of an aromatic dicarboxylic acid of the formula HOOC—$R_2$—COOH.

2. A vat dyestuff of the general formula

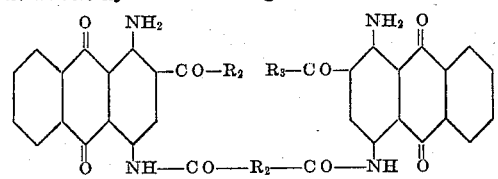

wherein $R_1$ and $R_3$ stand for an aryl radical each and wherein —CO—$R_2$—CO— stands for the radical of an aromatic dicarboxylic acid of the formula HOOC—$R_2$—COOH, wherein the two —COOH groups are attached to different benzene rings which are interconnected by a member of the group consisting of a single bond, an azo bridge and a ring system condensed with the two benzene rings consisting of at least one and at the most three further rings.

3. A vat dyestuff of the general formula

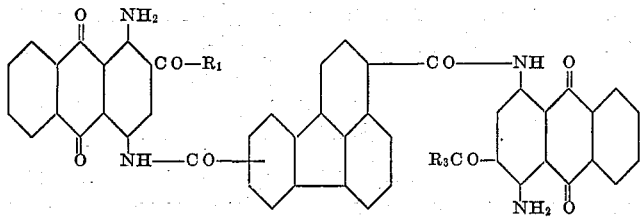

wherein $R_1$ and $R_3$ stand for an aryl radical each.

4. A vat dyestuff of the general formula

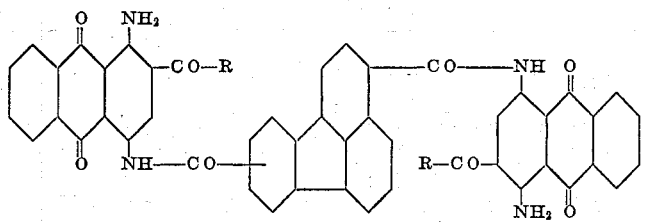

wherein each R stands for a halogen-phenyl radical.

5. A vat dyestuff of the general formula

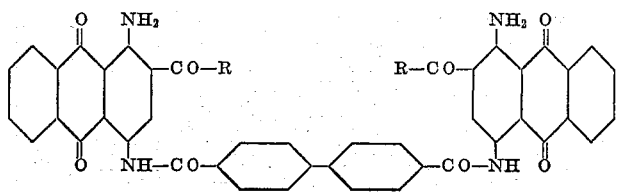

wherein each R stands for a halogenphenyl radical.
6. A vat dyestuff of the general formula
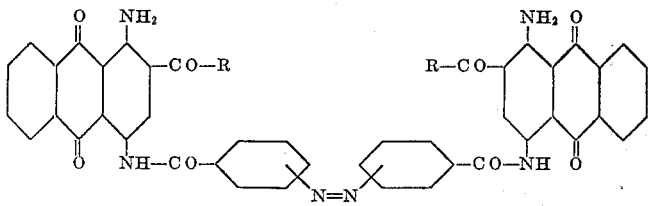
wherein each R stands for a halogenphenyl radical.
7. The vat dyestuff of the formula
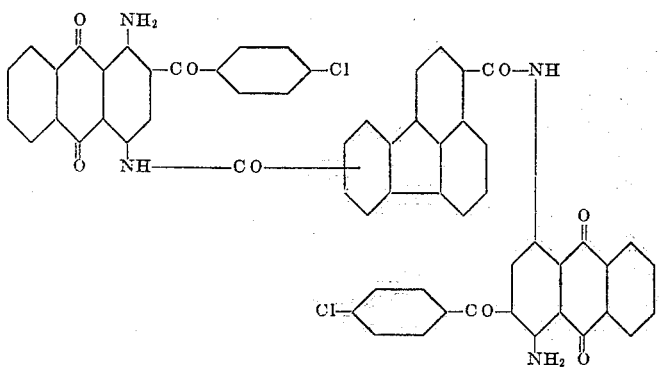
8. The vat dyestuff of the formula
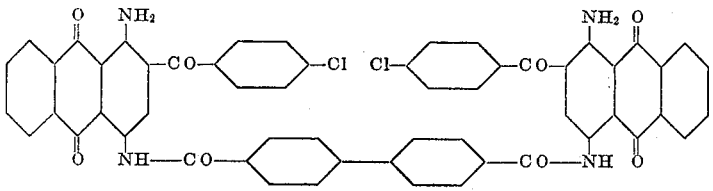
9. The vat dyestuff of the formula
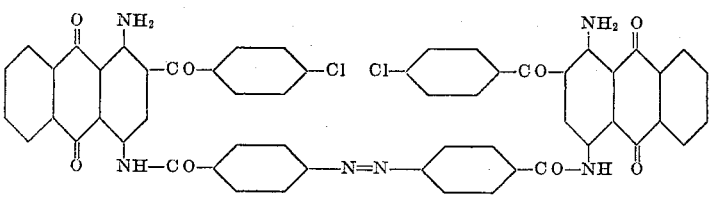
10. The vat dyestuff of the formula
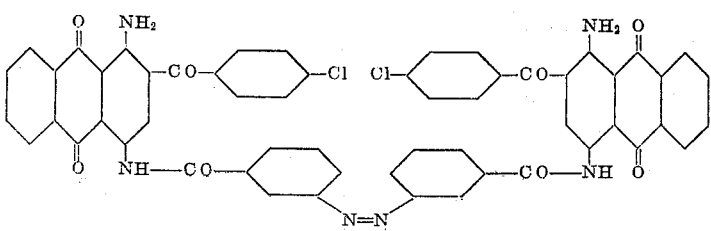

11. The vat dyestuff of the formula
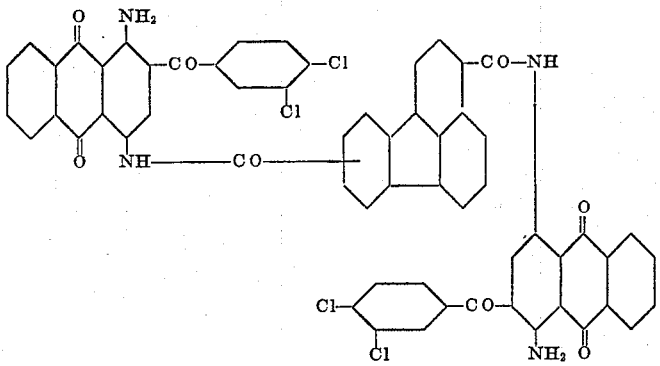
EDUARD MOERGELI.
REFERENCES CITED
The following references are of record in the file of this patent:
UNITED STATES PATENTS
| Number | Name | Date |
|---|---|---|
| 2,186,389 | Neresheimer et al. | Jan. 9, 1940 |
| 2,299,141 | Hauser et al. | Oct. 20, 1942 |
| 2,508,814 | Coffey et al. | May 23, 1950 |
FOREIGN PATENTS
| Number | Country | Date |
|---|---|---|
| 216,980 | Germany | May 1908 |
| 421,172 | Great Britain | Dec. 11, 1934 |